(12) United States Patent
Humeres et al.

(10) Patent No.: US 12,071,060 B1
(45) Date of Patent: Aug. 27, 2024

(54) SYSTEM AND METHOD FOR POSITIONING OR REMOVING PIN

(71) Applicant: Caterpillar Global Mining Equipment LLC, Denison, TX (US)

(72) Inventors: Adam Humeres, Tucson, AZ (US); David Matthew Frank, Sahuarita, AZ (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 0 days.

(21) Appl. No.: 18/347,619

(22) Filed: Jul. 6, 2023

(51) Int. Cl.
| | |
|---|---|
| *B23P 6/00* | (2006.01) |
| *B23P 19/04* | (2006.01) |
| *B25B 27/02* | (2006.01) |
| *B60P 1/28* | (2006.01) |
| *F16B 19/02* | (2006.01) |
| *B23P 19/02* | (2006.01) |
| *B23P 19/027* | (2006.01) |
| *B25B 27/04* | (2006.01) |

(52) U.S. Cl.
CPC ............. *B60P 1/283* (2013.01); *B23P 6/00* (2013.01); *B23P 19/04* (2013.01); *B25B 27/02* (2013.01); *F16B 19/02* (2013.01); *B23P 19/025* (2013.01); *B23P 19/027* (2013.01); *B25B 27/026* (2013.01); *B25B 27/04* (2013.01); *Y10T 29/4973* (2015.01)

(58) Field of Classification Search
CPC ....... F16B 19/02; B25B 27/026; B25B 27/04; B25B 27/02; B23P 19/025; B23P 19/026; B23P 19/027; B23P 6/00; B23P 19/02; Y10T 29/4973
See application file for complete search history.

(56) References Cited

U.S. PATENT DOCUMENTS

| | | | |
|---|---|---|---|
| 5,850,679 A * | 12/1998 | Hoffman | B25B 27/026 29/252 |
| 6,883,221 B1 | 4/2005 | Hayes, III | |
| 6,990,713 B2 | 1/2006 | Tally et al. | |
| 2009/0241313 A1 | 10/2009 | Vess | |
| 2014/0231374 A1 * | 8/2014 | Foust | B66C 23/70 212/347 |

FOREIGN PATENT DOCUMENTS

KR 101212516 B1 * 12/2012 ............ B23P 19/027

* cited by examiner

Primary Examiner — Jermie E Cozart

(57) ABSTRACT

A system for positioning or removing a pin from a work machine includes a tool. The tool includes a first elongate member. The first elongate member defines a first end and a second end opposite to the first end. The tool also includes a first member fixedly coupled with the first elongate member at the first end of the first elongate member. The first member defines a first through-opening to facilitate receipt of the pin within the tool, and at least two through-holes. The tool further includes a second member removably coupled with the first elongate member at the second end of the first elongate member. The second member defines a second through-opening.

20 Claims, 9 Drawing Sheets

SYSTEM AND METHOD FOR POSITIONING OR REMOVING PIN

TECHNICAL FIELD

The present disclosure relates to a system and a method for positioning or removing a pin from a work machine.

BACKGROUND

A work machine, such as, a mining truck, an off-highway truck, a wheel loader, a dozer, or an excavator may be used to perform a variety of applications at a worksite. Such work machines include pins to connect one or more components with each other. In some examples, such pins facilitate pivoting of components relative to each other. For example, some work machines, such as the mining truck or the off-highway truck, may include one or more pins that connect a dump body to a machine frame and also allow pivoting of the dump body relative to the machine frame. As machine size increases, a size and weight of the pins may also increase, and it may be cumbersome for an assembly personnel to handle and position the pins in pin bores on the work machine.

U.S. Pat. No. 6,883,221 describes a pin removal and placement tool that has a body member made of plate steel having a contact surface and a rear edge. Tool also may have an anvil plate mounted on a striking plate, a drive shaft, and a handle projecting at a right angle from the body member. The striking plate is fixedly mounted to the rear edge and anvil plate is disposed at a selected angle to the drive shaft to enhance the striking force of drive shaft and to reduce the length of the tool so as to facilitate its insertion between the teeth of buckets, etc. A shoe may be mounted on tool to adjust the clearance between contact surface and drive shaft. The handle may be either removably or fixedly attached to the body member and be dimensioned and mounted to selectively project from a selected side thereof, or from both sides thereof.

SUMMARY OF THE DISCLOSURE

In an aspect of the present disclosure, a system for positioning or removing a pin from a work machine is provided. The system includes a tool. The tool includes a first elongate member defining a first end and a second end opposite to the first end. The tool also includes a first member fixedly coupled with the first elongate member at the first end of the first elongate member. The first member defines a first through-opening to facilitate receipt of the pin within the tool, and at least two through-holes. The tool further includes a second member removably coupled with the first elongate member at the second end of the first elongate member. The second member defines a second through-opening.

In another aspect of the present disclosure, a method for positioning or removing a pin from a work machine is provided. The method includes providing a tool including a first elongate member defining a first end and a second end opposite to the first end, a first member fixedly coupled with the first elongate member at the first end of the first elongate member, and defining a first through-opening and at least two through-holes, and a second member removably coupled with the first elongate member at the second end of the first elongate member, and defining a second through-opening. The method also includes removably coupling the tool with a portion of the work machine defined around a pin bore in the work machine. The method further includes applying a push force on the pin to position the pin within the pin bore or a pull force on the pin to remove the pin from the pin bore. The method includes removing the tool from the portion of the work machine.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
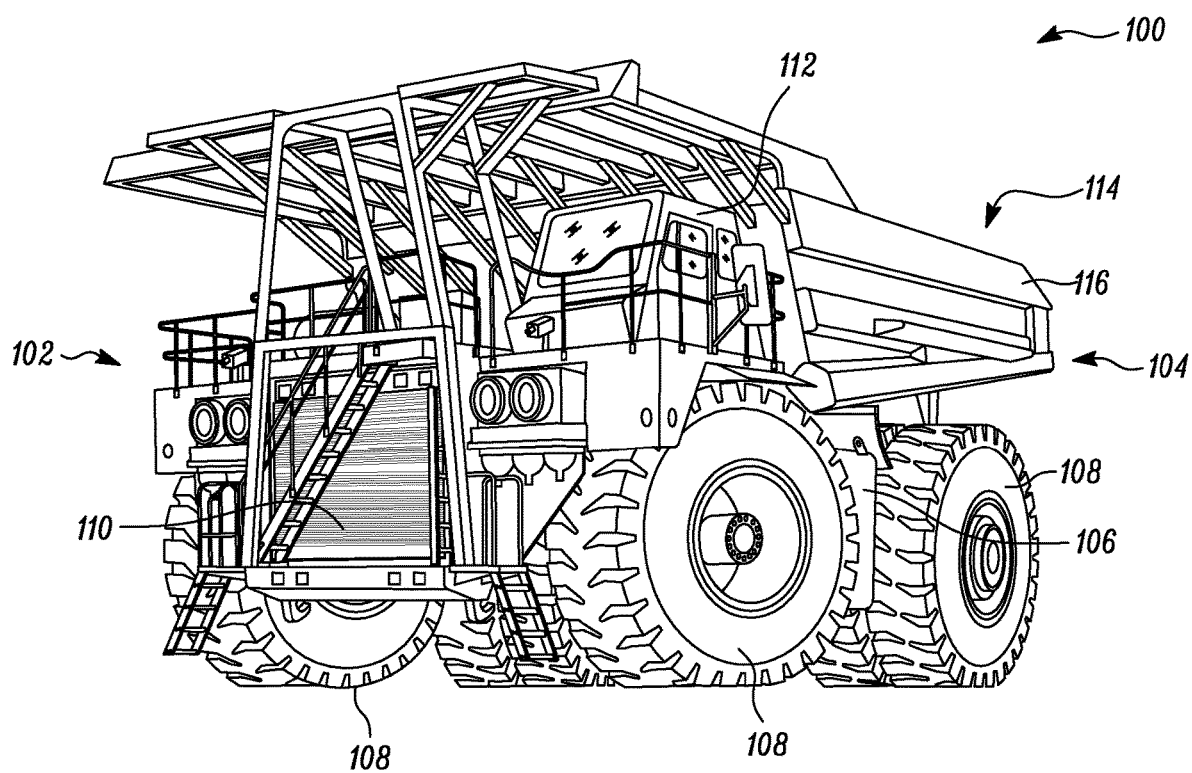
FIG. 1 is a schematic perspective view of a work machine, according to an example of the present disclosure.

Referring to FIG. 1, a schematic perspective view of an exemplary work machine 100 is illustrated. The work machine 100 is embodied as a mining truck that may be used to move payload, such as, asphalt, debris, dirt, snow, feed, gravel, logs, raw minerals, recycled material, rock, sand, woodchips, etc. from one location to another location. However, the work machine 100 may include any other work/construction machine, such as, an excavator, a dozer, a wheel loader, a track-type tractor, a motor grader, or any other vehicle that may be used for purposes, such as, digging, construction, landscaping, and the like. Further, the work machine 100 may be manually operated, or the work machine may have various levels of autonomy, such as a fully autonomous machine, a semi-autonomous machine, a remotely operated machine, or a remotely supervised machine.

The work machine 100 defines a front end 102 and a rear end 104. The work machine 100 includes a frame 106. The frame 106 supports a number of ground engaging members 108 of the work machine 100. Each ground engaging member 108 is embodied as a wheel herein. Alternatively, the work machine 100 may include tracks or drums instead of wheels. The work machine 100 also includes an enclosure 110 mounted to the frame 106. The enclosure 110 may house a power source, such as, an engine, a battery module, a fuel cell, and the like, to provide power to various components of the work machine 100 for operational and mobility requirements.

The work machine 100 further includes an operator cabin 112 mounted on the frame 106. An operator of the work machine 100 may sit or stand in the operator cabin 112 to overlook machine operations. The operator cabin 112 may include various control devices that may be used for controlling one or more operations of the work machine 100. The work machine 100 further includes a dump body 114. The dump body 114 includes a box portion 116. The box portion 116 may hold the payload. The dump body 114 may move relative to the frame 106 between a raised position and a lowered position.

Figure 2:
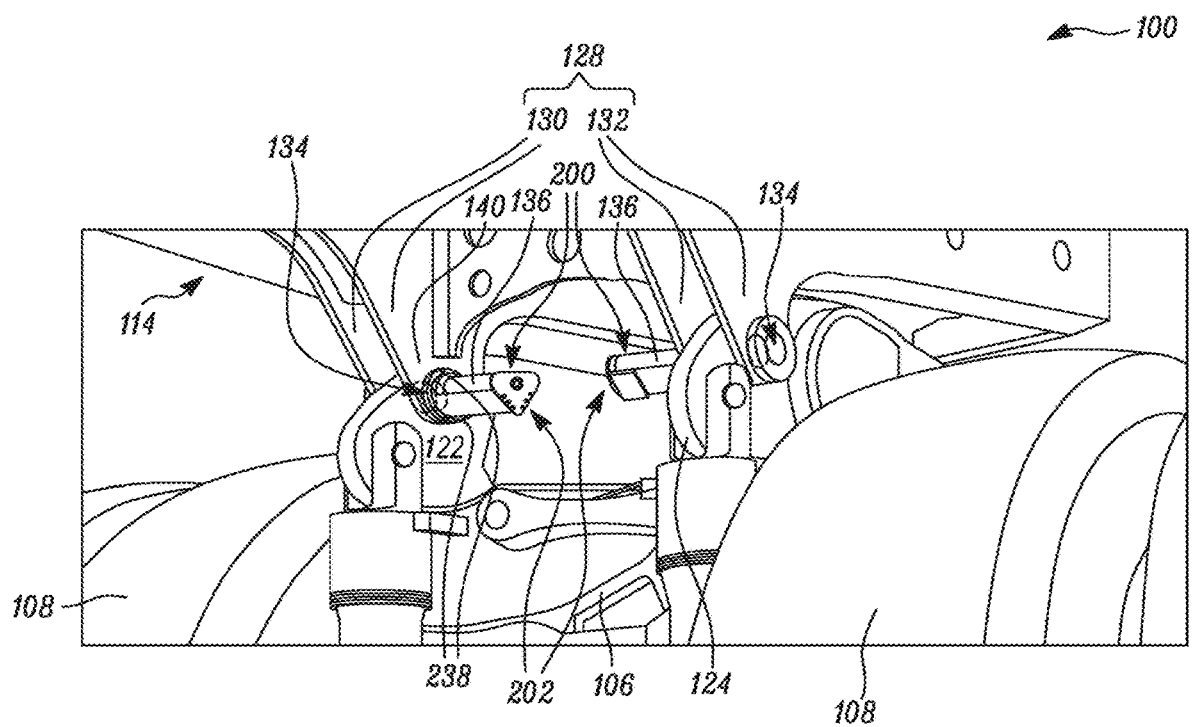
FIG. 2 illustrates a schematic perspective view of a portion of the work machine of FIG. 1 and a tool for positioning or removing a pin from the work machine, according to an example of the present disclosure.

Referring to FIG. 2, a schematic perspective view of a section of the work machine 100 of FIG. 1 is illustrated. The work machine 100 includes a first linkage arm 122 and a second linkage arm 124. The first linkage arm 122 and the second linkage arm 124 are each coupled with the frame 106 and extend parallel to each other.

The dump body 114 includes an articulating mechanism 128. The articulating mechanism 128 includes a pair of first links 130 and a pair of second links 132. The pair of first links 130 are disposed at either side of the first linkage arm 122. The pair of second links 132 are disposed at either side of the second linkage arm 124. Further, the work machine 100 defines two pin bores 134. Specifically, the first linkage arm 122 and the pair of first links 130 together define one of the pin bores 134. Whereas the second linkage arm 124 and the pair of second links 132 together define another of the pin bore 134. Each pin bore 134 receives a corresponding pin 136 in order to couple the dump body 114 with the frame 106. FIG. 2 also illustrates a system 200 for positioning or removing the pin 136 from the work machine 100. The system 200 includes a tool 202. FIG. 2 illustrates two tools 202 for coupling the two pins 136 with the work machine 100.

Figure 3:
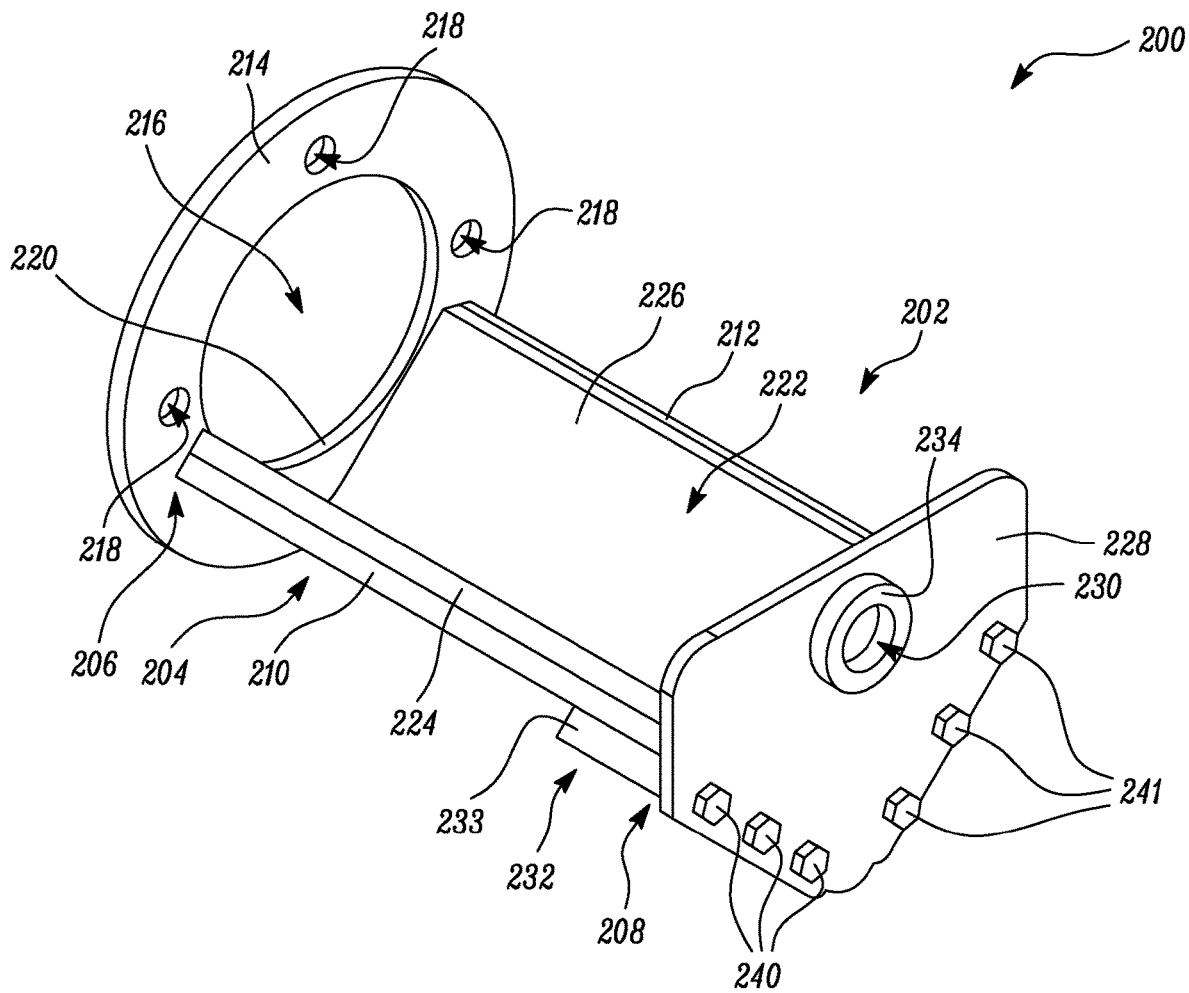
FIG. 3 is a schematic perspective view of the tool for positioning or removing the pin from the work machine of FIG. 1, according to an example of the present disclosure.

Referring to FIG. 3, the tool 202 includes a first elongate member 204. The first elongate member 204 defines a first end 206 and a second end 208 opposite to the first end 206. The first elongate member 204 includes a first plate 210 and a second plate 212 arranged in a V-shaped pattern. In some examples, the first plate 210 and the second plate 212 may be substantially orthogonal to each other. In other examples, the first plate 210 and the second plate 212 may be obliquely disposed relative to each other.

The tool 202 also includes a second elongate member 222 extending parallel to the first elongate member 204 and coupled with the first elongate member 204. The second elongate member 222 includes a third plate 224 disposed on the first plate 210 and a fourth plate 226 disposed on the second plate 212. Further, the third plate 224 and the fourth plate 226 are arranged in a V-shaped pattern. In some examples, the third plate 224 and the fourth plate 226 may be substantially orthogonal to each other. In other examples, the third plate 224 and the fourth plate 226 may be obliquely disposed relative to each other. In some examples, the second elongate member 222 may be made of a non-metallic material. For example, the second elongate member 222 may be made of polymer. Further, the third plate 224 may be coupled with the first plate 210 using fasteners (not shown), such as bolts, screws, pins, and the like. Moreover, the fourth plate 226 may be coupled with the second plate 212 using fasteners (not shown), such as bolts, screws, pins, and the like.

The tool 202 further includes a first member 214 fixedly coupled with the first elongate member 204 at the first end 206 of the first elongate member 204. The first member 214 may be at least partially annular in shape. In the illustrated example of FIG. 3, the first member 214 is annular in shape.

The first member 214 defines a first through-opening 216 to facilitate receipt of the pin 136 (see FIG. 2) within the tool 202, and two or more through-holes 218. In the illustrated example of FIG. 3, the first member 214 defines three through-holes 218 that are circumferentially spaced apart from each other. In other examples, the first member 214 may define any number of through-holes 218, as per a size of the first member 214. The first member 214 defines a circumferential surface 220 facing the first through-opening 216.

The tool 202 also includes a second member 228 removably coupled with the first elongate member 204 at the second end 208 of the first elongate member 204. Further, each of the first elongate member 204, the first member 214, and the second member 228 may be made of a metallic material. In some other examples, each of the first elongate member 204, the first member 214, and the second member 228 may be made of a non-metallic material that may be sturdy enough to hold a weight of the pin 136. The second member 228 defines a second through-opening 230. The tool 202 also includes a washer 234 coupled with the second member 228 around the second through-opening 230. In an example, the washer 234 may be welded to the second member 228.

Figure 4:
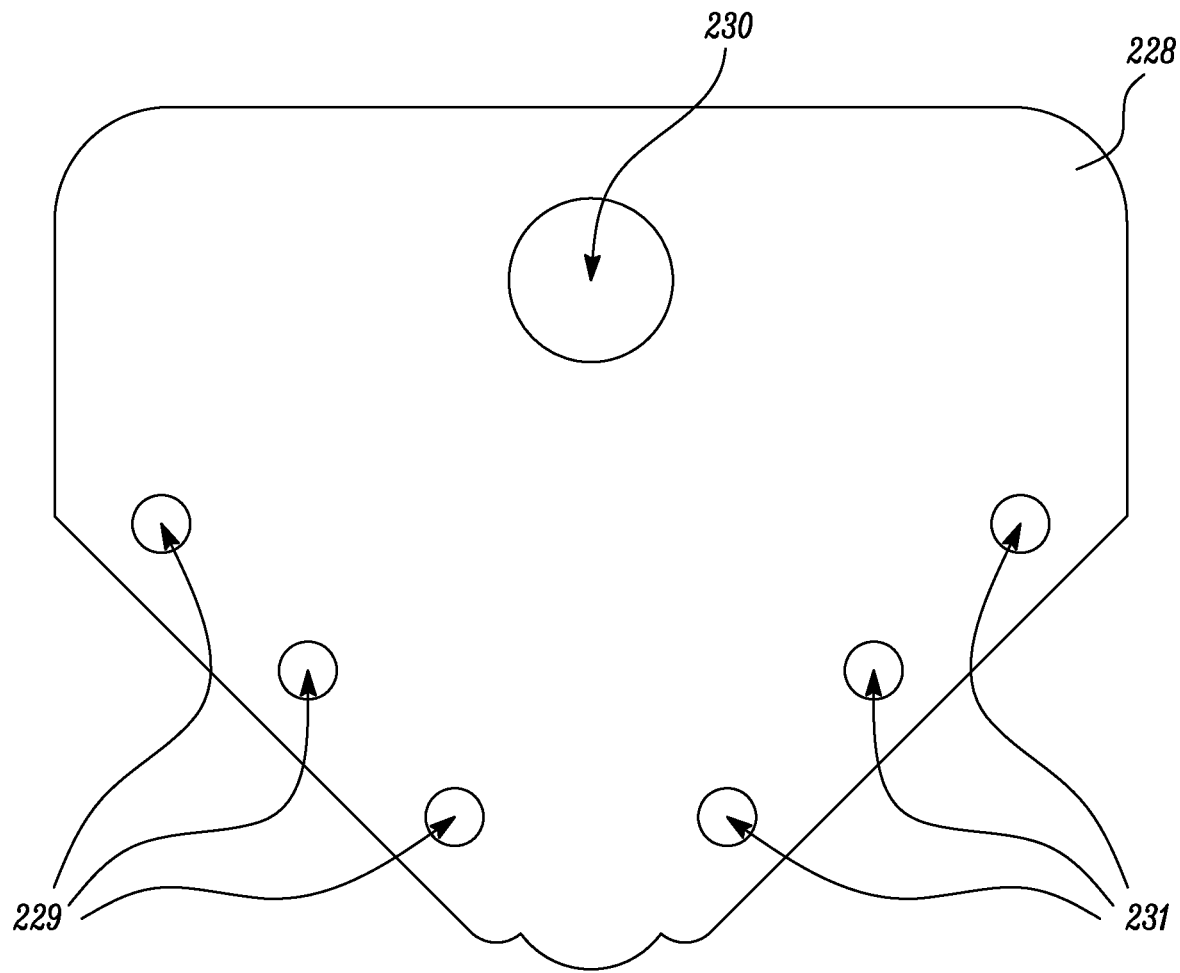
FIG. 4 is a schematic view of a second member of the tool of FIG. 3.

Referring to FIGS. 3 and 4, a schematic view of the second member 228 of the tool 202 is illustrated. The second member 228 includes a number of third through-openings 229, 231 (shown in FIG. 4). Specifically, the second member 228 defines six third through-openings 229, 231. The third through-openings 229 are linearly spaced apart from each other and the third through-openings 231 are linearly spaced apart from each other. Further, the third through-openings 229 are arranged in an angularly relative to the third through-openings 231.

Figure 5:
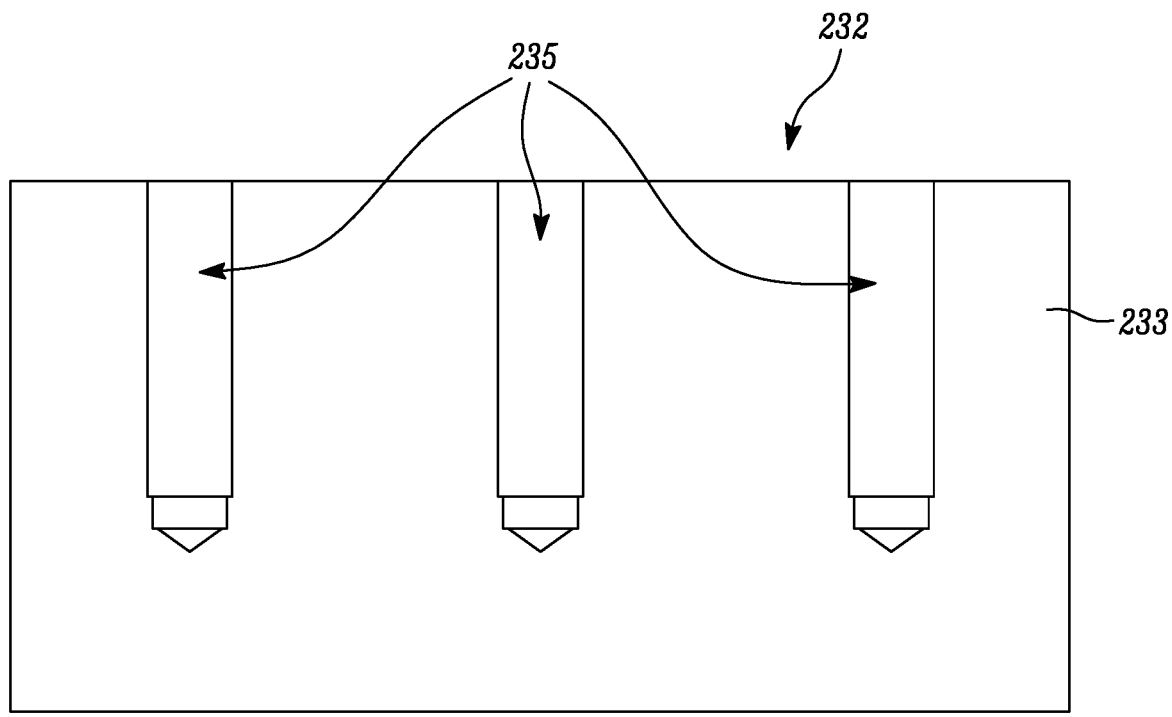
FIG. 5 is a schematic view of a bracket of the tool of FIG. 3.

Referring to FIGS. 3 and 5, the tool 202 further includes a bracket 232 that removably couples the second member 228 within the first elongate member 204. The bracket 232 is fixedly coupled with the first elongate member 204 and removably coupled with the second member 228. In an example, the bracket 232 may be coupled with the first elongate member 204 by techniques, such as, welding, soldering, brazing, and the like, without any limitations. It may be contemplated that the bracket 232 may be coupled with the first elongate member 204 by fasteners.

The bracket 232 includes a pair of plates 233 (only one of which is visible in FIG. 3). The pair of plates 233 are arranged in a V-shaped pattern similar to the first elongate member 204. Based on an arrangement of the first and second plates 210, 212, the plates 233 may be substantially orthogonal to each other or may be obliquely disposed relative to each other. Each plate 233 includes a number of blind holes 235 (shown in FIG. 5). Specifically, each plate 233 includes three blind holes 235.

Referring again to FIG. 3, the tool 202 further includes two or more second mechanical fasteners 240, 241. The second mechanical fasteners 240, 241 removably couple the second member 228 with the bracket 232. In the illustrated example of FIG. 3, the tool 202 includes six second mechanical fasteners 240, 241. In other examples, any number of second mechanical fasteners 240, 241 may be used based on application attributes. As shown in FIG. 3, the tool 202 includes three second mechanical fasteners 240 that removably couple the second member 228 with one of the plate 233 and the tool 202 includes three second mechanical fasteners 241 that removably couple the second member 228 with another of the plates 233. The second mechanical fasteners 240, 241 are received within the corresponding third through-openings 229, 231 (see FIG. 4) in the second member 228 and the corresponding blind holes 235 (see FIG. 5) in the plates 233 to couple the second member 228 with the plate 233.

Figure 6:
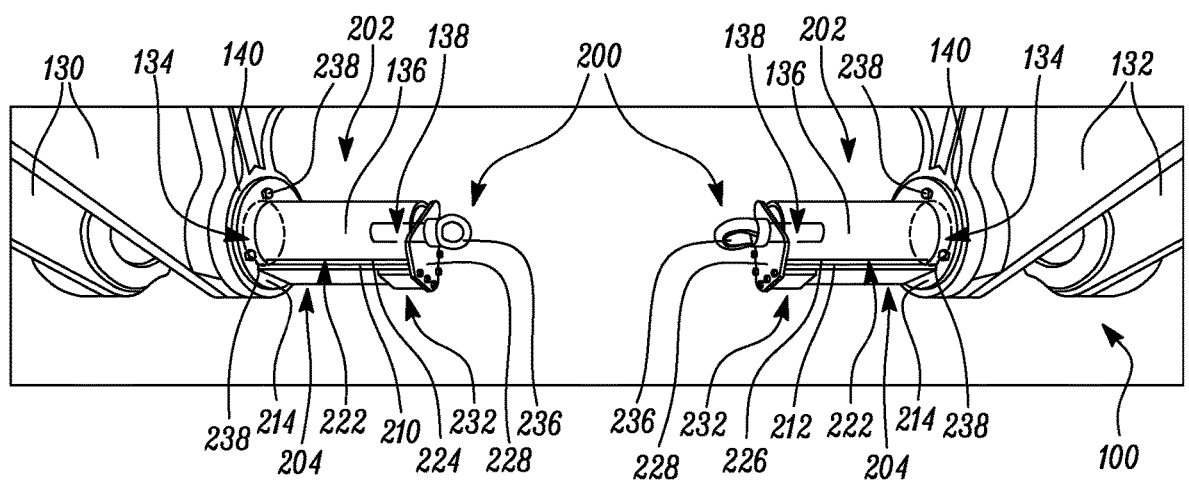
FIG. 6 is a schematic perspective view of the tool coupled with the work machine of FIG. 1.

Referring to FIG. 6, a schematic view of the tool 202 coupled with the work machine 100 is illustrated. Specifically, a section of the first links 130 and the second links 132 are illustrated in FIG. 6. When the pin 136 is received within the tool 202, the pin 136 at least partially abuts with the circumferential surface 220 (see FIG. 3) of the first member 214. Further, when the pin 136 is received within the tool 202, the pin 136 at least partially contacts the second elongate member 222.

The tool 202 further includes a support member 236. The support member 236 removably couples the second member 228 with the pin 136. The pin 136 defines a pin opening 138. In some examples, the pin 136 may include a number of internal threads (not shown) facing the pin opening 138. The second through-opening 230 (see FIG. 3) in the second member 228 aligns with the pin opening 138 in the pin 136 to receive the support member 236 therethrough. In some examples, the support member 236 may include a number of external threads (not shown) that engage with the internal threads in the pin opening 138 to removably couple the second member 228 with the pin 136. It should be noted that a diameter of the support member 236 is lesser than a diameter of the second through-opening 230, so that the support member 236 may easily pass therethrough while coupling and removal of the support member 236. The support member 236 may be removably coupled with the pin 136 by an assembly personnel after the pin 136 is received within the tool 202.

Further, the tool 202 includes two or more first mechanical fasteners 238 that removably couple the first member 214 with a portion 140 of the work machine 100 defined around the pin bore 134 in the work machine 100. In the illustrated example of FIG. 6, the first mechanical fasteners 238 removably couple the first member 214 with the portion 140 defined by the first link 130. The two or more first mechanical fasteners 238 pass through corresponding through-holes 218 (see FIG. 3) in the first member 214 and openings (not shown) in the portion 140 to removably couple the first member 214 with the portion 140 of the work machine 100. In the illustrated example of FIG. 6, three first mechanical fasteners 238 are illustrated. However, a total number of the first mechanical fasteners 238 may vary as per a number of the through-holes 218 and the size of the first member 214.

Figure 7:
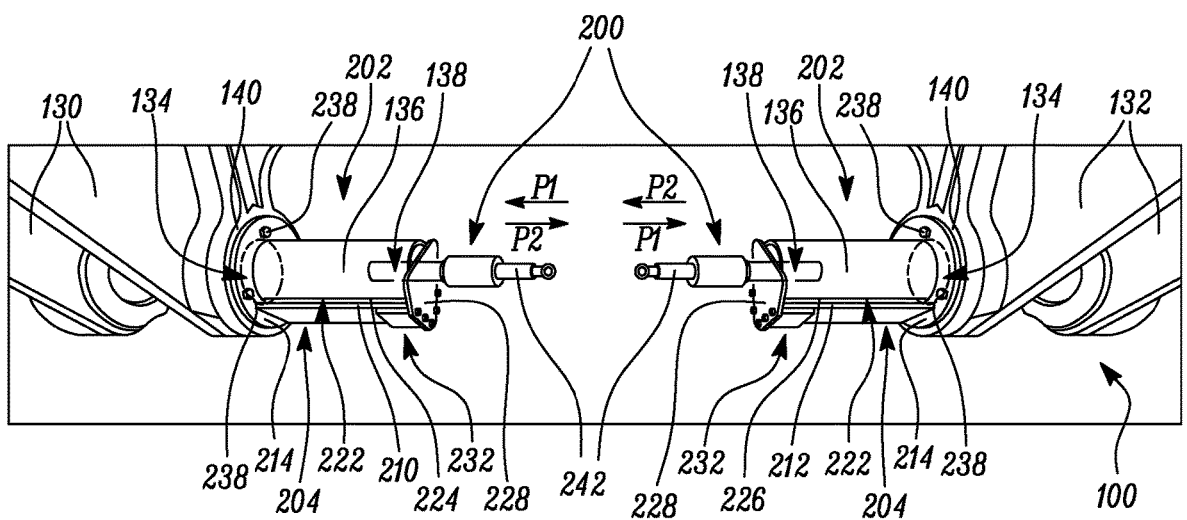
FIG. 7 is a schematic perspective view of a system including the tool of FIG. 3 and an actuation device, according to an example of the present disclosure.

Referring to FIG. 7, the system 200 also includes an actuation device 242. The actuation device 242 applies a push force P1 on the pin 136 to position the pin 136 within the pin bore 134 in the work machine 100 or a pull force P2 on the pin 136 to remove the pin 136 from the pin bore 134. In some examples, the actuation device 242 may include a hydraulic actuator or a pneumatic actuator. In other examples, the actuation device 242 may embody a push rod that may be operated by the assembly personnel to apply the push force P1 or the pull force P2. The second member 228 and the pin 136 interchangeably receive the actuation device 242 and the support member 236. For example, the assembly personnel may remove the support member 236 and then couple the actuation device 242 with the pin 136. It should be noted that a diameter of a rod of the actuation device 242 is lesser than a diameter of the second through-opening 230, so that the rod may easily pass therethrough for applying the push force P1 and/or the pull force P2.

Referring to FIGS. 3, 6, and 7, when the pin 136 is to be positioned within the pin bore 134, the pin 136 is received within the tool 202 via the first through-opening 216. The pin 136 is supported by the second elongate member 222 and the first member 214. Further, the support member 236 is coupled with the pin 136. Furthermore, the tool 202 and the pin 136 are positioned near the portion 140 and the first member 214 is coupled with the portion 140 using the first mechanical fasteners 238. Subsequently, the support member 236 is removed and the actuation device 242 is coupled with the pin 136. Further, the push force P1 is applied on the pin 136 using the actuation device 242 to position the pin 136 within the pin bore 134. Once the pin 136 is received in the pin bore 134, the tool 202 is removed from the portion 140.

In order to remove the pin 136 from the pin bore 134, the tool 202 is positioned proximate to the portion 140 and the first member 214 is coupled with the portion 140 using the first mechanical fasteners 238. Further, the actuation device 242 is coupled with the pin 136. Subsequently, the pull force P2 is applied on the pin 136 using the actuation device 242, based on which the pin 136 is received within the tool 202 via the first through-opening 216. Further, the actuation device 242 is removed and the support member 236 is coupled with the pin 136. Subsequently, the tool 202 is removed from the portion 140.

Figure 9:
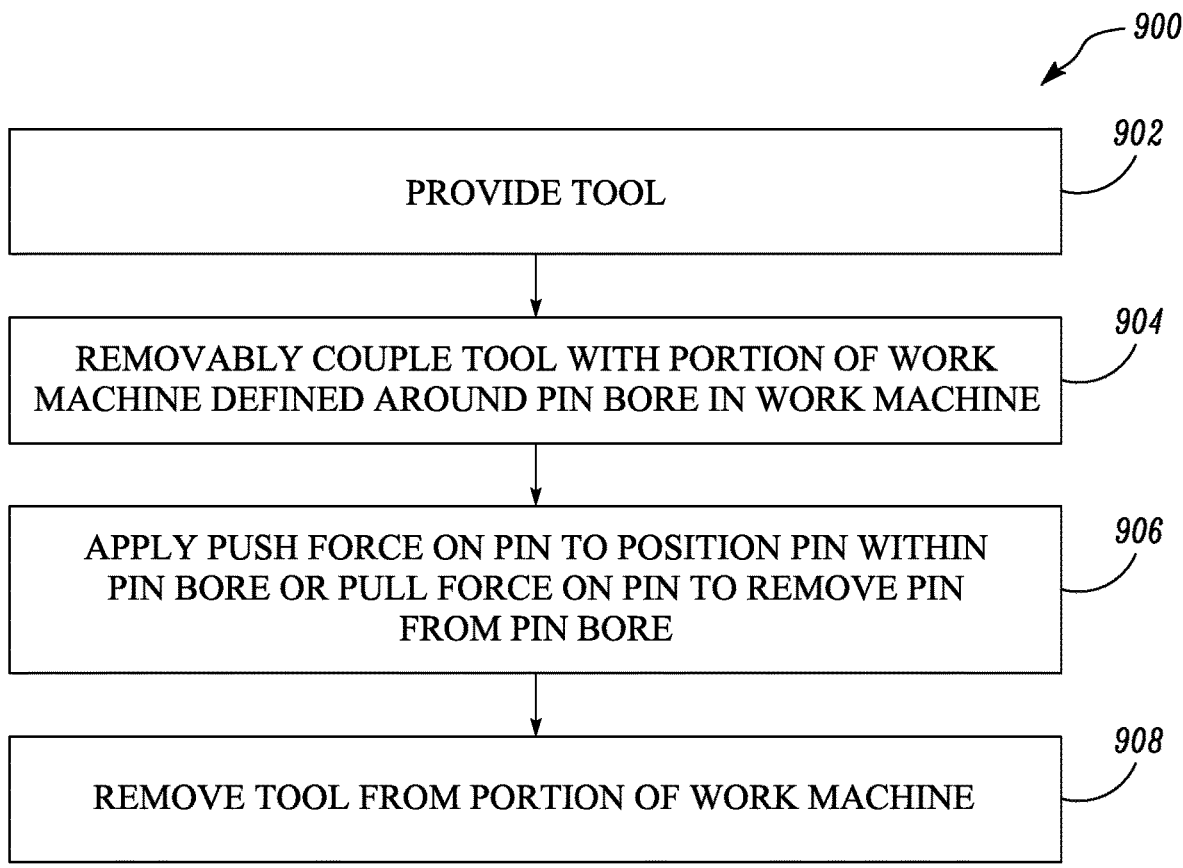
FIG. 9 is a flowchart for a method of positioning or removing the pin from the work machine of FIG. 1, according to an example of the present disclosure.

Referring to FIG. 9, a schematic view of a tool 302 for positioning or removing the pin 136 shown in FIG. 2 from the work machine 100 of FIG. 1 is illustrated, according to another example of the present disclosure. The tool 302 is substantially similar to the tool 202 with common components being referred to by the same reference numerals. However, the tool 302 includes a first member 314. The first member 314 is semi-annular in shape instead of having the annular shape similar to the first member 214 of the tool 202.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The tool 202, 302 of the present disclosure allows installation as well as removal of various pins, such as the pin 136, associated with the work machine 100. Further, the tool 202, 302 may reduce human effort of manually lifting and aligning the pin 136 for positioning or removing the pin 136 from the work machine 100.

The tool 202, 302 and the pin 136 may be positioned/removed from the work machine 100 as a single unit for installation or removal, respectively. Thus, the system 200 described herein may eliminate handling of the tool 202, 302 and the pin 136 separately, which may simplify the positioning and removal process of the pin 136. Further, the system 200 eliminates the step of aligning the pin 136 and the tool 202, 302 near the work machine 100, which may reduce operator fatigue as well as time required to align various components. The tool 202, 302 described herein is simple in construction and cost-effective. Overall, the tool 202, 302 allows positioning and removal of the pin 136 in a time efficient manner without requiring costly set-ups or high operator expertise.

Figure 8:
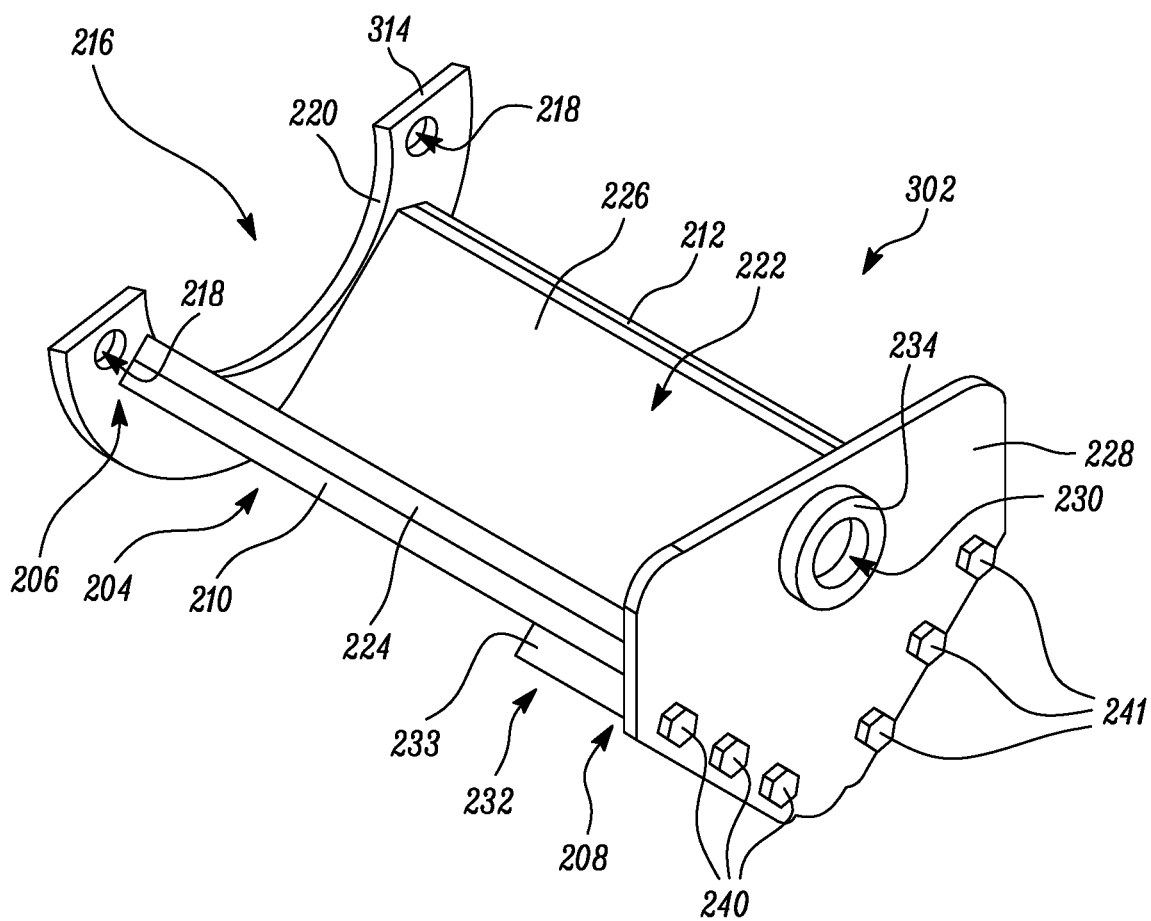
FIG. 8 is a schematic perspective view of a tool for positioning or removing the pin from the work machine of FIG. 1, according to another example of the present disclosure.

Referring to FIG. 9, a flowchart of a method 900 for positioning or removing the pin 136 from the work machine 100 of FIG. 1 is illustrated. The method 900 will be explained in relation to the tool 202 shown in FIGS. 2 to 7. However, the method 900 is equally applicable to the tool 302 shown in FIG. 8. Referring to FIGS. 1 to 7 and FIG. 9, at step 902, the tool 202 is provided. The tool 202 includes the first elongate member 204 defining the first end 206 and the second end 208 opposite to the first end 206. The tool 202 also includes the first member 214 fixedly coupled with the first elongate member 204 at the first end 206 of the first elongate member 204. The first member 214 defines the first through-opening 216 and at least two through-holes 218. The tool 202 further includes the second member 228 removably coupled with the first elongate member 204 at the second end 208 of the first elongate member 204. The second member 228 defines the second through-opening 230.

At step 904, the tool 202 is removably coupled with the portion 140 of the work machine 100 defined around the pin bore 134 in the work machine 100. Further, for removably coupling the tool 202 with the portion 140 of the work machine 100, the first member 214 of the tool 202 is removably coupled with the portion 140 of the work machine 100 via the two or more first mechanical fasteners 238 of the tool 202.

Further, the method 900 also includes a step at which the pin 136 is received within the tool 202 via the first through-opening 216 in the first member 214. The method 900 further includes a step at which, the pin 136 is supported on each of the first member 214 and the first elongate member 204. Moreover, for supporting the pin 136 on each of the first member 214 and the first elongate member 204, the pin 136 abuts with the circumferential surface 220 of the first member 214. The circumferential surface 220 faces the first through-opening 216. For supporting the pin 136 on each of the first member 214 and the first elongate member 204, the pin 136 contacts with the second elongate member 222. The second elongate member 222 extends parallel to the first elongate member 204 and is coupled with the first elongate member 204.

The method 900 also includes a step at which the second member 228 of the tool 202 is removably coupled with the pin 136. For removably coupling the second member 228 of the tool 202 with the pin 136, the second through-opening 230 in the second member 228 is aligned with the pin opening 138 in the pin 136. Further, the support member 236 is received through the second through-opening 230 and the pin opening 138, such that the support member 236 removably couples the second member 228 with the pin 136.

At step 906, the push force P1 is applied on the pin 136 to position the pin 136 within the pin bore 134 or the pull force P2 is applied on the pin 136 to remove the pin 136 from the pin bore 134. To apply the push force P1 on the pin 136 to position the pin 136 within the pin bore 134, the support member 236 is removed from the pin 136 and the second member 228. Further, the actuation device 242 is coupled with the second member 228 and the pin 136. The second member 228 and the pin 136 interchangeably receive the actuation device 242 and the support member 236. Furthermore, the push force P1 is applied on the pin 136 via the actuation device 242 to position the pin 136 within the pin bore 134. Moreover, the actuation device 242 is removed from the second member 228 and the pin 136 based on the positioning of the pin 136 within the pin bore 134.

To apply the pull force P2 on the pin 136 to remove the pin 136 from the pin bore 134, the actuation device 242 is coupled with the second member 228 and the pin 136. Further, the pull force P2 is applied on the pin 136, via the actuation device 242, to remove the pin 136 from the pin bore 134. Furthermore, the actuation device 242 is removed from the second member 228 and the pin 136, based on the receiving of the pin 136 within the tool 202.

At step 908, the tool 202 is removed from the portion 140 of the work machine 100.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

What is claimed is:

1. A system for positioning or removing a pin from a work machine, the system comprising:
   a tool including:
      a first elongate member defining a first end and a second end opposite to the first end;
      a first member fixedly coupled with the first elongate member at the first end of the first elongate member, the first member defining a first through-opening to facilitate receipt of the pin within the tool, and at least two through-holes; and
      a second member removably coupled with the first elongate member at the second end of the first elongate member, and defining a second through-opening,
   wherein the first member is at least partially annular in shape.

2. The system of claim 1,
   wherein the first member defines a circumferential surface facing the first through-opening, and
   wherein, when the pin is received within the tool, the pin at least partially abuts with the circumferential surface of the first member.

3. The system of claim 1, wherein each of the first elongate member, the first member, and the second member is made of a metallic material.

4. The system of claim 1, wherein the first elongate member includes a first plate and a second plate arranged in a V-shaped pattern.

5. The system of claim 4,
   wherein the tool further includes a second elongate member extending parallel to the first elongate member and coupled with the first elongate member,
   wherein the second elongate member includes a third plate disposed on the first plate and a fourth plate disposed on the second plate,
   wherein the third plate and the fourth plate are arranged in a V-shaped pattern, and
   wherein, when the pin is received within the tool, the pin at least partially contacts the second elongate member.

6. The system of claim 5, wherein the second elongate member is made of a non-metallic material.

7. The system of claim 1,
   wherein the tool further includes a support member removably coupling the second member with the pin, and wherein the second through-opening in the second member aligns with a pin opening in the pin to receive the support member therethrough.

8. The system of claim 7, further comprising an actuation device configured to apply a push force on the pin to position the pin within a pin bore in the work machine or a pull force on the pin to remove the pin from the pin bore,
wherein the second member and the pin interchangeably receive the actuation device and the support member.

9. The system of claim 1,
wherein the tool further includes at least two first mechanical fasteners removably coupling the first member with a portion of the work machine defined around a pin bore in the work machine, and
wherein the at least two first mechanical fasteners pass through corresponding through-holes in the first member to removably couple the first member with the portion of the work machine.

10. The system of claim 1, wherein the tool further includes:
a bracket that removably couples the second member within the first elongate member, the bracket being fixedly coupled with the first elongate member and removably coupled with the second member; and
at least two second mechanical fasteners removably coupling the second member with the bracket.

11. The system of claim 1, wherein the tool further includes a washer coupled with the second member around the second through-opening.

12. A method for positioning or removing a pin from a work machine, the method comprising:
providing a tool including a first elongate member defining a first end and a second end opposite to the first end, a first member fixedly coupled with the first elongate member at the first end of the first elongate member, and defining a first through-opening and at least two through-holes, and a second member removably coupled with the first elongate member at the second end of the first elongate member, and defining a second through-opening;
removably coupling the tool with a portion of the work machine defined around a pin bore in the work machine;
applying a push force on the pin to position the pin within the pin bore or a pull force on the pin to remove the pin from the pin bore; and
removing the tool from the portion of the work machine.

13. The method of claim 12, wherein the step of removably coupling the tool with the portion of the work machine further includes removably coupling the first member of the tool with the portion of the work machine via at least two first mechanical fasteners of the tool.

14. The method of claim 12, further comprising:
receiving the pin within the tool via the first through-opening in the first member;
supporting the pin on each of the first member and the first elongate member; and
removably coupling the second member of the tool with the pin.

15. The method of claim 14,
wherein the step of supporting the pin on each of the first member and the first elongate member further includes abutting the pin with a circumferential surface of the first member, and
wherein the circumferential surface faces the first through-opening.

16. The method of claim 14,
the step of supporting the pin on each of the first member and the first elongate member further includes contacting the pin with a second elongate member, and
wherein the second elongate member extends parallel to the first elongate member and is coupled with the first elongate member.

17. The method of claim 14, wherein the step of removably coupling the second member of the tool with the pin further includes:
aligning the second through-opening in the second member with a pin opening in the pin; and
receiving a support member through the second through-opening and the pin opening, such that the support member removably couples the second member with the pin.

18. The method of claim 17, wherein the step of applying the push force on the pin to position the pin within the pin bore further includes:
removing the support member from the pin and the second member;
removably coupling an actuation device with the second member and the pin, wherein the second member and the pin interchangeably receive the actuation device and the support member;
applying, via the actuation device, the push force on the pin to position the pin within the pin bore; and
removing the actuation device from the second member and the pin based on the positioning of the pin within the pin bore.

19. The method of claim 18, wherein the step of applying the pull force on the pin to remove the pin from the pin bore further includes:
removably coupling the actuation device with the second member and the pin applying, via the actuation device, the pull force on the pin to remove the pin from the pin bore; and
removing the actuation device from the second member and the pin based on the receiving of the pin within the tool.

20. A system for positioning or removing a pin from a work machine, the system comprising:
a tool including:
a first elongate member defining a first end and a second end opposite to the first end;
a first member fixedly coupled with the first elongate member at the first end of the first elongate member, the first member defining a first through-opening to facilitate receipt of the pin within the tool, and at least two through-holes; and
a second member removably coupled with the first elongate member at the second end of the first elongate member, and defining a second through-opening,
wherein the first elongate member includes a first plate and a second plate arranged in a V-shaped pattern.

* * * * *